US009765922B2

United States Patent
Dai et al.

(10) Patent No.: US 9,765,922 B2
(45) Date of Patent: Sep. 19, 2017

(54) DISPLAY APPARATUS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Wei-Fang Dai, Shenzhen (CN); Kuang-Lung Lin, New Taipei (TW); Ching-Hua Tsai, New Taipei (TW); Jen-Hui Oh, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 193 days.

(21) Appl. No.: 14/751,753

(22) Filed: Jun. 26, 2015

(65) Prior Publication Data

US 2016/0081214 A1  Mar. 17, 2016

(30) Foreign Application Priority Data

Sep. 15, 2014  (CN) .......................... 2014 1 0467646

(51) Int. Cl.
*H05K 1/11* (2006.01)
*F16M 13/02* (2006.01)

(52) U.S. Cl.
CPC ....... *F16M 13/02* (2013.01); *F16M 2200/065* (2013.01)

(58) Field of Classification Search
CPC .......................... F16M 13/02; F16M 2200/065
USPC .................................................. 361/784, 755
See application file for complete search history.

(56) References Cited

U.S. PATENT DOCUMENTS

| | | | | |
|---|---|---|---|---|
| 7,551,426 B2* | 6/2009 | Huang | ..................... | G06F 1/162 |
| | | | | 361/679.02 |
| 8,144,452 B2* | 3/2012 | Huang | ..................... | G06F 1/181 |
| | | | | 361/679.02 |
| 9,179,567 B2* | 11/2015 | Hung | ........................ | H05K 7/02 |
| 9,220,177 B2* | 12/2015 | Hida | ......................... | H05K 7/02 |
| 2005/0264983 A1* | 12/2005 | Chen | ....................... | G06F 1/1601 |
| | | | | 361/679.27 |
| 2010/0267428 A1* | 10/2010 | Wang | ................... | H04M 1/0237 |
| | | | | 455/575.4 |
| 2012/0176741 A1* | 7/2012 | Wu | ......................... | G06F 1/1601 |
| | | | | 361/679.09 |
| 2012/0229962 A1* | 9/2012 | Chen | ....................... | G06F 1/162 |
| | | | | 361/679.01 |
| 2016/0076691 A1* | 3/2016 | Dai | ......................... | F16M 11/06 |
| | | | | 361/679.01 |
| 2016/0081208 A1* | 3/2016 | Dai | ......................... | F16M 11/10 |
| | | | | 361/679.01 |

* cited by examiner

*Primary Examiner* — Hung S Bui
(74) *Attorney, Agent, or Firm* — Steven Reiss

(57) ABSTRACT

A display apparatus with decreased thickness for displaying images includes a frame, a display panel received in the frame, a circuit module, and at least one fixing portion. The display panel displays images. The circuit module is outside of the frame, and provides signals and voltages to the display panel for driving the display module to display the images. The at least one fixing portion is used for fixing the circuit module on a surface of the frame away from the display panel. The circuit module is rotatably inserted into the at least one fixing portion.

13 Claims, 4 Drawing Sheets

DISPLAY APPARATUS

CROSS-REFERENCE TO RELATED APPLICATIONS

This application claims priority to Chinese Patent Application No. 201410467646.0 filed on Sep. 15, 2014, the contents of which are incorporated by reference herein.

FIELD

The subject matter herein generally relates to a display apparatus.

BACKGROUND

A display apparatus includes a display panel, a loudspeaker, a main board, and a power board. The main board and the power board are mounted behind the display panel. A thickness of the display apparatus needs to be decreased.

BRIEF DESCRIPTION OF THE FIGURES

Implementations of the present technology will now be described, by way of example only, with reference to the attached figures.

DETAILED DESCRIPTION

Figure 1:
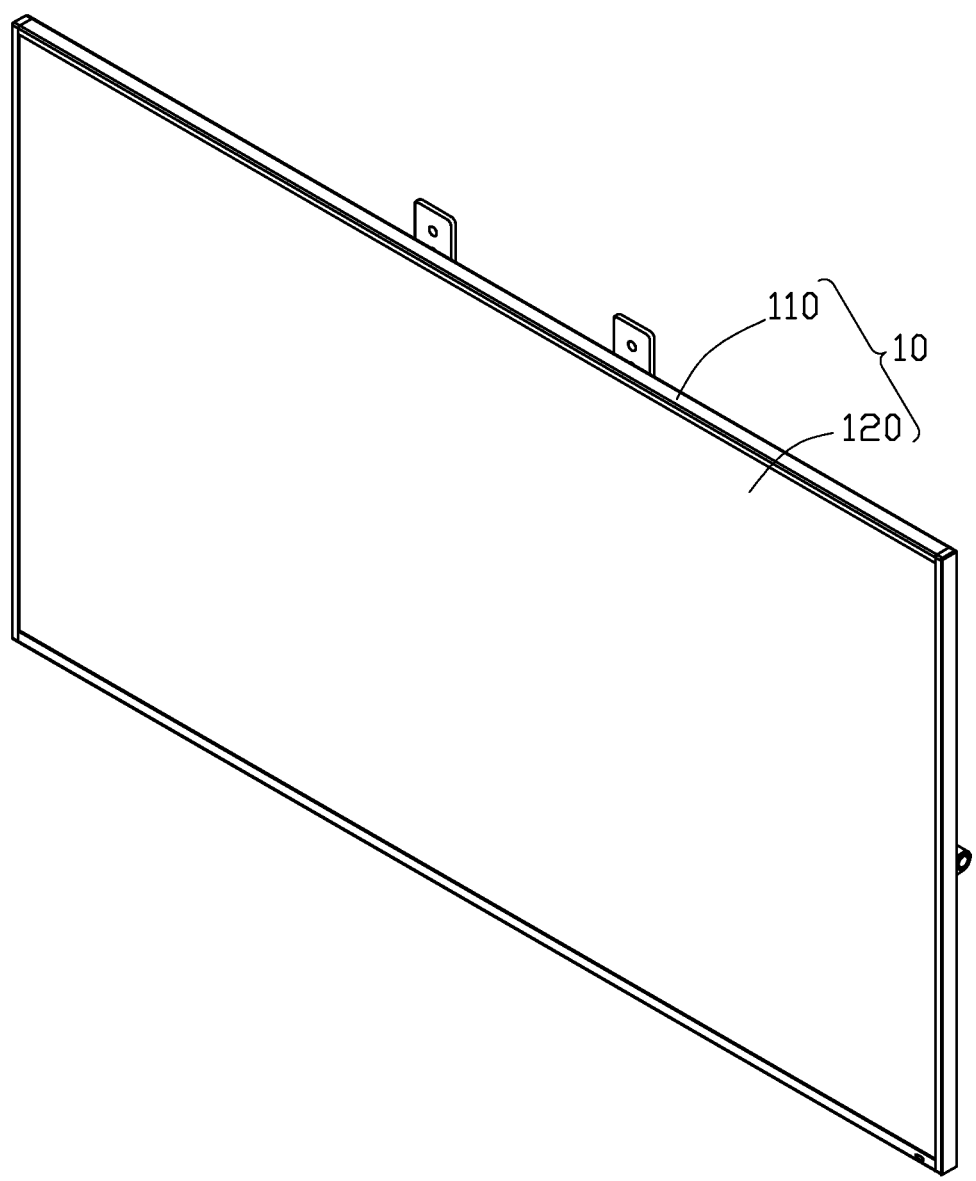
FIG. 1 is an isometric view of an embodiment of a display apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a display apparatus with decreased thickness.

Figure 2:
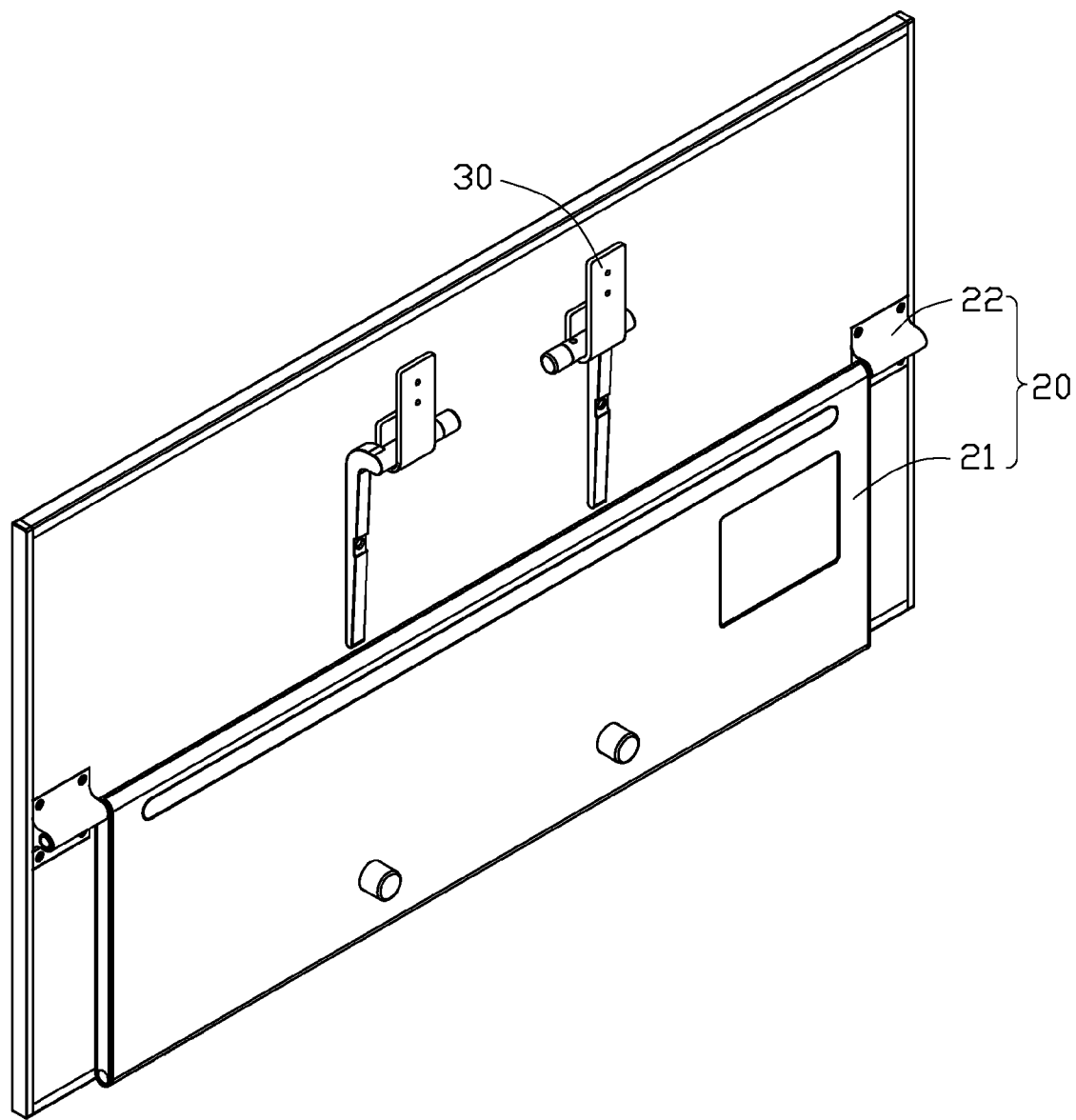
FIG. 2 is an isometric view of an embodiment of the display apparatus of FIG. 1 viewed from another angle.
Figure 3:
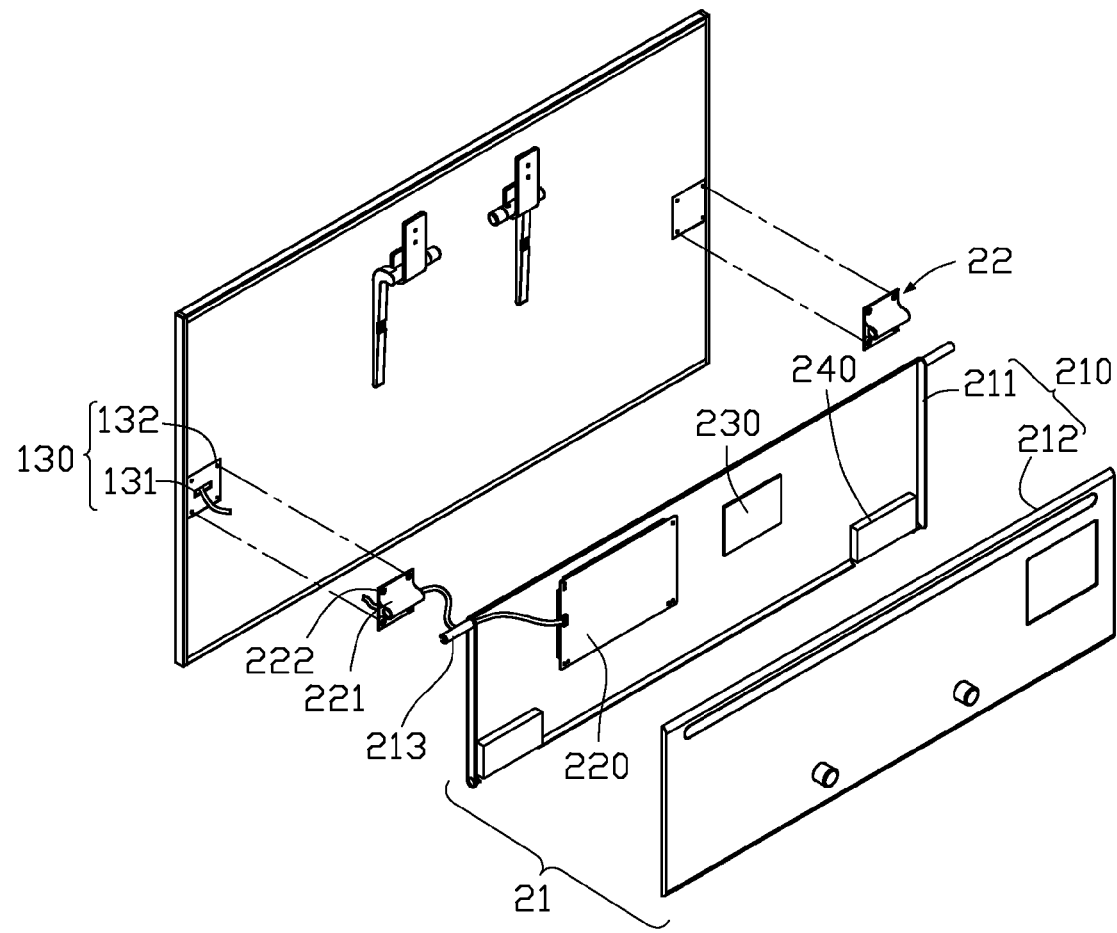
FIG. 3 is an exploded, isometric view of an embodiment of the display apparatus of FIG. 2, the display apparatus comprising two fixing portions.

FIGS. 1-3 illustrate an embodiment of the display apparatus 100. The display apparatus 100 includes a display module 10, a circuit mechanism 20 mounted on a back surface of the display module 10, and a location mechanism 30 above the circuit mechanism 20. The circuit mechanism 20 provides signals to the display module 10 for controlling the display module 10 to display images. The location mechanism 30 locates the display apparatus 100 on an external structure, such as a wall. In at least embodiment, the display apparatus 100 is a television. A size of the circuit mechanism 20 is smaller than a size of the display module 10.

The display module 10 includes a frame 110, a display panel 120 received in the frame 110, and two positioning portions 130. The frame 110 is substantially rectangular. The display panel 120 for displaying images is exposed from the frame 110. The positioning portions 130 are symmetrically located on a surface of the frame 110 away from the display panel 120. The positioning portion 130 cooperates with the circuit mechanism 20 to locate a position of the circuit mechanism 20 on the frame 110. The positioning portion 130 defines a first opening 131 and a plurality of receiving portions 132. The first opening 131 is adjacent to a side of the frame 110. In at least one embodiment, the display module 10 includes two positioning portions 130 and four receiving portions 132. The positioning portions 130 are symmetrically located around a vertical line through the center of the display panel 120. The receiving portions 132 are respectively located on corners of a rectangular. The first opening 131 is set in a center of the rectangular where the receiving portions 132 are contained in.

The circuit mechanism 20 includes a circuit module 21 and two fixing portions 22 corresponding to the positioning portions 130. The circuit module 21 provides electrical signals to the display panel 120, and is rotatably inserted into the fixing portions 22. The fixing portion 22 fixes the circuit module 21 on the frame 110. In at least one embodiment, the circuit module 21 is electrically connected to the display panel 120.

The circuit module 21 includes a housing 210, a main board 220, a power board 230, and two loudspeakers 240. The housing 210 includes a first cover 211 and a second cover 212. The first cover 211 cooperates with the second cover 212 to form a receiving space for receiving the main board 220, the power board 230, the loudspeakers 240, and other electrical components (not shown). The main board 220, the power board 230, and the loudspeakers 240 are mounted on the first cover 211. In at least one embodiment, the main board 220 and the power board 230 are arranged in a line. In other embodiments, the main board 220 and the power board 230 are overlapped.

The first cover 211 includes two shafts 213 mounted on opposite side surfaces of the first cover 211. An axis of the shaft 213 is perpendicular to the side surface of the first cover 211. The shaft 213 is a cylinder which is substantially hollow. The shaft 213 defines a gap 214 facing the frame 110.

The main board 220 is a printed circuit board providing driving signals and sequential control signals to the display panel 120.

The power board 230 is a printed circuit board for providing voltages. The power board 230 is electrically connected to the main board 220.

The loudspeakers 240 are arranged on opposite corners of the first cover 211.

The display apparatus 100 locates the circuit mechanism 20 for driving the display module 10 outside of the display module 10, thus a thickness of the display module 10 is decreased.

Figure 4:
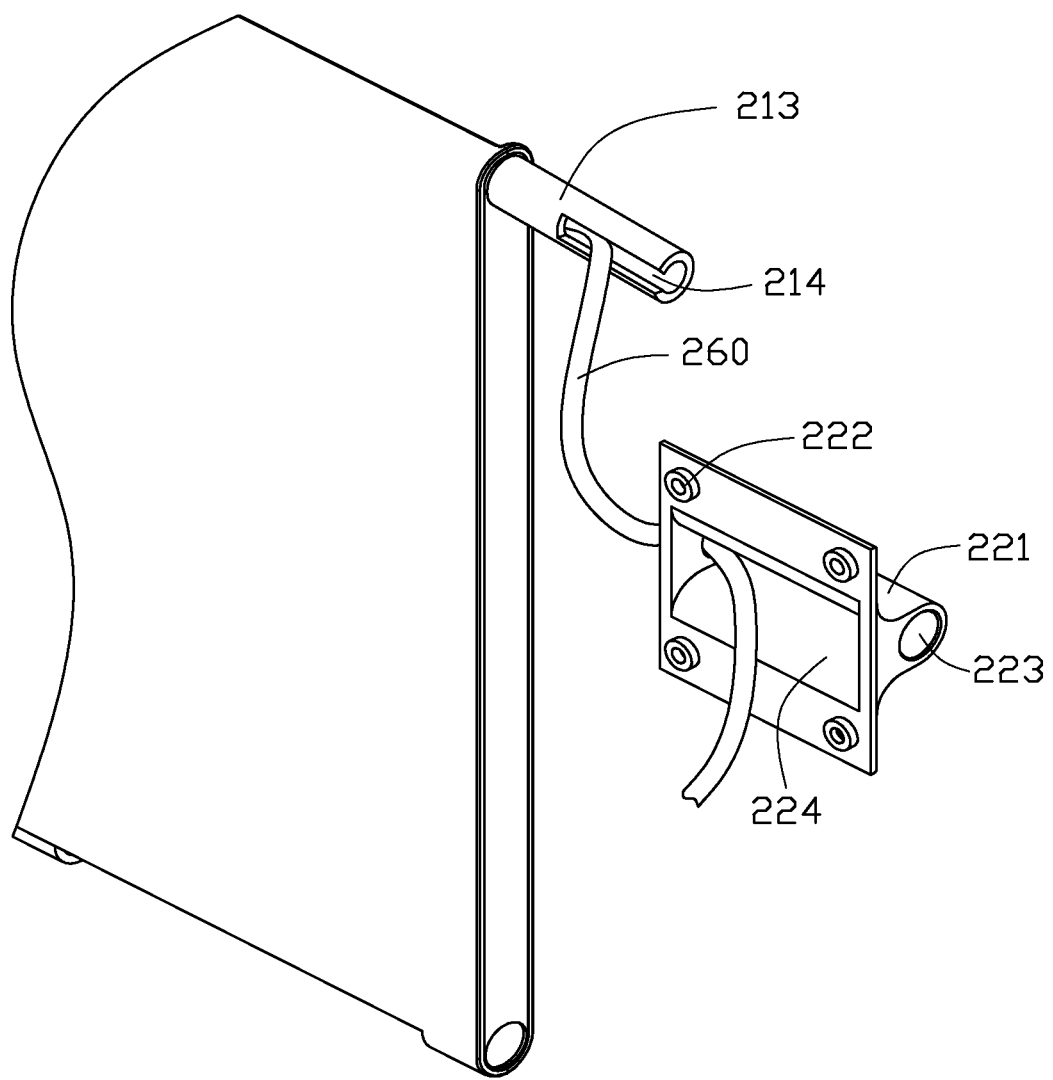
FIG. 4 is an isometric view of an embodiment of the fixing portion of FIG. 3.

FIG. 4 illustrates the embodiment of the fixing portion 22. The fixing portion 22 cooperates with the positioning portion 130 to fix the circuit mechanism 21 on the frame 110. The fixing portion 22 includes a main body 221. The main body 221 is substantially arched. The main body 221 defines a plurality of through holes 222 corresponding to the receiving portions 132, and a pivot hole 223 and an second opening 224 are also defined. The pivot hole 223 receives the shaft 213. The second opening 224 corresponds to the first opening 131, and communicates with the pivot hole 223. In at least embodiment, the through holes 222 are arranged on corners of the main body 221. The second opening 224 is set in a center of the rectangular where the through holes 223 are contained in.

The circuit mechanism 20 further includes a flexible flat cable (FFC) 260. An end of the FFC 260 is electrically connected to the main board 220. An opposite end of the FFC 260 is electrically connect to the display panel 120.

In assembly, the main board 220, the power board 230, and the loudspeaker 240 are mounted on the first cover 211. The first cover 211 and the second cover 212 cooperate with each other to form a receiving space. The shafts 213 are received in the pivot holes 223. The gap 214 faces the second opening 224. The second opening 224 faces the first opening 131. The FFC 260 passes through the shaft 213, the gap 214, and the second opening 224, and the first opening 131 in that orderly to be electrically connected to the display panel 120. The through hole 222 corresponds to the receiving portion 132 to fix the fixing portion 21 on the frame 110 via screws (not shown).

In other embodiments, the display module 10 communicates with the circuit mechanism 20 wirelessly. Thus, the power board 230, the fixing portion 22, and the FFC 260 can be omitted.

In use, the display apparatus 100 integrates the main board 220, the power board 230, and the loudspeaker 240 into the circuit mechanism 20. The circuit mechanism 20 for driving the display module 10 is located outside of the display module 10 and is hung on the back surface of the frame 110. Therefore, a thickness of the display module 10 is decreased.

While various exemplary and preferred embodiments have been described, the disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A display apparatus for displaying images, the display apparatus comprising:
   a frame;
   a display panel received in the frame, the display panel configured to display images;
   a circuit module outside of the frame, the circuit module configured to provides signals and voltages to the display panel for driving the display panel to display the images; and
   at least one fixing portion configured to fix the circuit module on a surface of the frame away from the display panel;
   wherein the circuit module is rotatably inserted into the at least one fixing portion, the display apparatus further comprises two positioning portions; the display apparatus comprises two fixing portions corresponding to the positioning portions; the positioning portions are symmetrically located on a surface of the frame away from the display panel, and the positioning portion cooperates with the corresponding fixing portion to locate a position of the circuit module on the frame, the positioning portion defines a plurality of receiving portions; the fixing portion defines a plurality of through holes corresponding to the receiving portions; the through holes cooperate with the receiving portions to fix the fixing portion on the display module via screws.

2. The display apparatus of claim 1, wherein the circuit module integrates a main board for providing signals to the display panel, a power board for providing voltages, and at least one loudspeaker together; the circuit module comprises a first cover and a second cover; the first cover and the second cover cooperate with each other to form a receiving space for receiving the main board, the power board, and the at least one loudspeaker.

3. The display apparatus of claim 2, wherein the fixing portion comprises a main body; the first cover comprises two shafts corresponding to the fixing portions; the shafts are symmetrically mounted on opposite side surfaces of the first cover; the main body defines a pivot hole; the shaft is received in the pivot hole of the corresponding fixing portion.

4. The display apparatus of claim 3, wherein an axis of the shaft is perpendicular to the corresponding side surface of the first cover.

5. The display apparatus of claim 3, wherein the circuit module further comprise a flexible flat cable (FFC); the frame defines a first opening; the fixing portion defines a second opening facing the first opening; the shaft defines a gap; the second opening communicates with the gap; an end of the FFC is electrically connected to the main board, and an opposite end of the FFC orderly passes through the shaft, the gap, the second opening, and the first opening to electrically connect to the display module.

6. The display apparatus of claim 1, wherein the display apparatus further comprises a location mechanism above the circuit module; the location mechanism locates the display apparatus on an external structure.

7. A display apparatus for displaying images, the display apparatus comprising:
   a display module configured to display images; and
   a circuit mechanism outside of the display module, the circuit mechanism configured to provide signals and voltages to the display module for driving the display module to display the images;
   wherein the circuit mechanism is rotatably fixed on the display module; the circuit mechanism integrates a main board for providing signals, a power board for providing voltages, and at least one loudspeaker together, the display module comprises two positioning portions; the circuit mechanism further comprises two fixing portions corresponding to the positioning portions; the positioning portion cooperates with the corresponding fixing portion to locate a position of the circuit mechanism on the display module, the positioning portion defines a plurality of receiving portions; the fixing portion defines a plurality of through holes corresponding to the receiving portions; the through holes cooperate with the receiving portions to fix the fixing portion on the display module via screws.

8. The display apparatus of claim 7, wherein the circuit mechanism comprise a first cover and a second cover; the first cover and the second cover cooperate with each other to form a receiving space for receiving the main board, the power board, and the at least one loudspeaker.

9. The display apparatus of claim 8, wherein the fixing portion comprises a main body; the first cover comprises two shafts corresponding to the fixing portions; the shafts are symmetrically mounted on opposite side surfaces of the first cover; the main body defines a pivot hole; the shaft is received in the pivot hole of the corresponding to the fixing portion.

10. The display apparatus of claim 9, wherein an axis of the shaft is perpendicular to the corresponding side surface of the first cover.

11. The display apparatus of claim 9, wherein the circuit mechanism further comprise a flexible flat cable (FFC); the fixing portion defines a first opening facing the display module; the shaft defines a gap; the second opening communicates with the gap; an end of the FFC is electrically connected to the main board, and an opposite end of the FFC orderly passes through the shaft, the gap, and the second opening to electrically connect to the display module.

12. The display apparatus of claim 11, wherein the display module comprises a frame and a display panel; the display panel is received in the frame; the circuit mechanism is hung on a surface of the frame away from the display panel; the positioning portion defines a second opening; the FFC passes through the second opening to electrically connect to the display panel.

13. The display apparatus of claim 7, wherein the display apparatus further comprises a location mechanism above the circuit mechanism; the location mechanism locates the display apparatus on an external structure.

* * * * *